INVENTOR
YOSHIHIRO KONISHI

BY

ATTORNEYS

WIDE FREQUENCY BAND CIRCULATOR

Filed April 4, 1968 2 Sheets-Sheet 1

INVENTOR
YOSHIHIRO KONISHI

BY

ATTORNEYS 3,544,920
WIDE FREQUENCY BAND CIRCULATOR
Yoshihiro Konishi, Sagamihara, Japan, assignor to Japan Broadcasting Corporation, Tokyo, Japan
Filed Apr. 4, 1968, Ser. No. 718,890
Claims priority, application Japan, Apr. 27, 1967, 42/26,555
Int. Cl. H01p 1/32, 5/12
U.S. Cl. 333—1.1 7 Claims

ABSTRACT OF THE DISCLOSURE

A Y-circulator using an anisotropic feature of a ferrite body under application of a DC magnetic field and having non-reversible characteristics, comprising cavity resonators at the inside of the outer conductor of the circulator, which are coupled only to the same phase component of the exciting energy in order to widen the operating frequency band, so as to realize a wide frequency band circulator having improved characteristics.

BACKGROUND OF THE INVENTION

Operation of a circular using ferrite is analyzed by three kinds of excitation of the terminal ports. These three kinds of excitation are same phase excitation, positive phase excitation and negative phase excitation, respectively. The conventional kinds of circulators are considered to be difficult for realizing wide frequency band characteristics by the operational principle, owing to the fact that each of the variation factors of the impedances for the case of the same phase exciting component, positive phase exciting component and negative phase exciting component is different from each other so that it is difficult to maintain a constant angle relation for each component on a Smith Chart when the center frequency of exciting energy is varied.

In order to solve such defect in widening the applicable frequency band in such kinds of circulators, it has been suggested to provide an impedance compensating circuit for each of the terminal ports for the same phase excitation of exciting energy. However, such system using an additional outside compensating circuit has disadvantages in that a sufficiently wide band characteristic is not obtained by reason that both of the positive and negative components are also affected by the additional circuit and that the circuit construction becomes very complicated.

Therefore, it has been an outstanding desire in this technical field to realize a wide band circulator by improving the circulator itself, while not sacrificing the non-reciprocal character of the circulator.

The present invention is intended to solve aforementioned problems.

SUMMARY OF THE INVENTION

The present invention relates to a wide band Y-type circulator having ferrite loaded at the coupling point of the inner conductors and having at least one cavity resonator housed inside the circulator, and more particularly, relates to a constructional feature of a circulator having a wide frequency band characteristic, which comprises at least one cavity resonator coupled at the inner conductor portion for same phase exciting of the component through slits, a capacitor or the like.

The present invention has for its object to realize a wide frequency band circulator, which need not include an outer compensating circuit at each terminal in order to realize the wide band characteristics but merely to vary the construction of the circulator itself.

Another object of the invention is to realize a wide frequency band circulator having insensitive characteristics for the temperature variation of the ferrite body.

A still further object of the invention is to realize a wide frequency band circulator with a very simple mechanism.

The present invention is to provide a practical construction of a circulator having a sufficient performance for the aforementioned objects.

The salient features of the invention will become more clear by the following description of the invention referring to the accompanying drawings.

DESCRIPTION OF THE PREFERRED EMBODIMENTS

Figure 1:
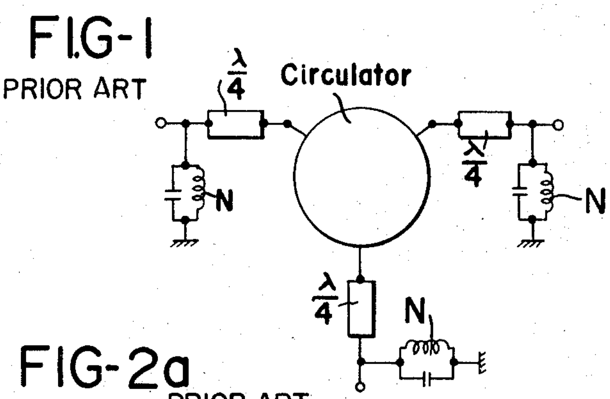
FIG-1 PRIOR ART
FIG. 1 is a circuit diagram of frequency band compensation networks used in conjunction with a conventional circulator.

In order to obtain a wide frequency band circulator, it is essential to equalize the impedance variation for each phase of the excitation modes. As it has not previously been possible to realize a wide band circulator by modifying the circulator construction itself, a conventional practice for widening the operational frequency band of a circulator consists in providing a resonating circuit for each of the terminals at outside of the circulator as shown in the circuit diagram of FIG. 1. Such a resonating circuit may be deemed to be a compensating circuit for load impedance, assuming the circulator is a load for the power supply source. However, such a circulator circuit using the outside compensating network has serious disadvantages. The circuit construction of the device including the circulator becomes complicated, moreover, by the analysis of operation of the circulator, the L–C resonating circuit connected to each of the terminals couples not only to the same phase excitation component but also to each of the positive and negative phase excitation components, so that a satisfactorily wide band character is not achieved.

The conventional circulator has another drawback in that the character may vary in accordance with the temperature variation of the ferrite owing to the constructional feature of the circulator itself.

Figure 2A:
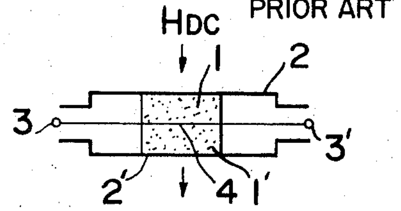
FIG-2a PRIOR ART
FIG. 2*a* shows schematically a cross section of a conventional circulator.
Figure 2B:
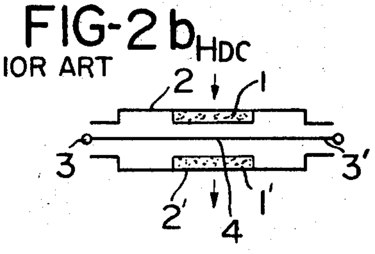
FIG-2b PRIOR ART
FIG. 2*b* shows also a cross section of a conventional circulator.

FIGS. 2*a* and 2*b* show schematically two types of typical circulator construction.

In these figures, 1, 1' show ferrite plates, 2, 2' are outer conductors of the circulator, 3, 3' are inner conductors of coaxial cables extended from two terminal ports out of three terminal ports all together and 4 shows coupling portion of the inner conductors.

The present invention has its object to mitigate the above mentioned disadvantages of the conventional circulators. The present invention is able to realize a wide frequency band circulator by the novel idea of varying construction of the circulator itself and also to realize a circulator having a self-compensating function of the character variation caused by temperature variation according to the need.

The present invention has as a feature to provide at least a resonator in a circulator coupling only to the same phase exciting component at the coupling portion of the inner conductors in order to realize a circulator which is equivalent to a circulator comprising parallel resonating circuits at each of the circulator terminals placed at points spaced apart from central coupling portion by a distance of $\lambda/4$. Said resonator comprises a ferrite plate or a dielectric body housed within the resonator and mounted on a metal plate of the circulator so as to form a good thermal contact between itself and a ferrite plate housed in the circulator and effecting the circulator function with an interposition of the metal plate. The metal plate forming the partition between the resonator and the circulator is provided with at least a hole or a slit so as to form a coupling mat between the circulator and the resonator for the same phase excitation component. When a temperature variation occurs in the perrite plate of the circulator, the temperature of the ferrite plate or the dielectric plate in the resonator also varies accordingly by the heat conduction. The circulator and the resonator are so constructed, according to an additional feature of the present invention, that the characteristic variation of the circulator caused by a temperature variation of the circulator ferrite plate is automatically compensated by a characteristic variation of the resonator owing to the corresponding temperature variation of the ferrite plate or dielectric plate in the resonator.

Figures 3A, 3B, 3C:
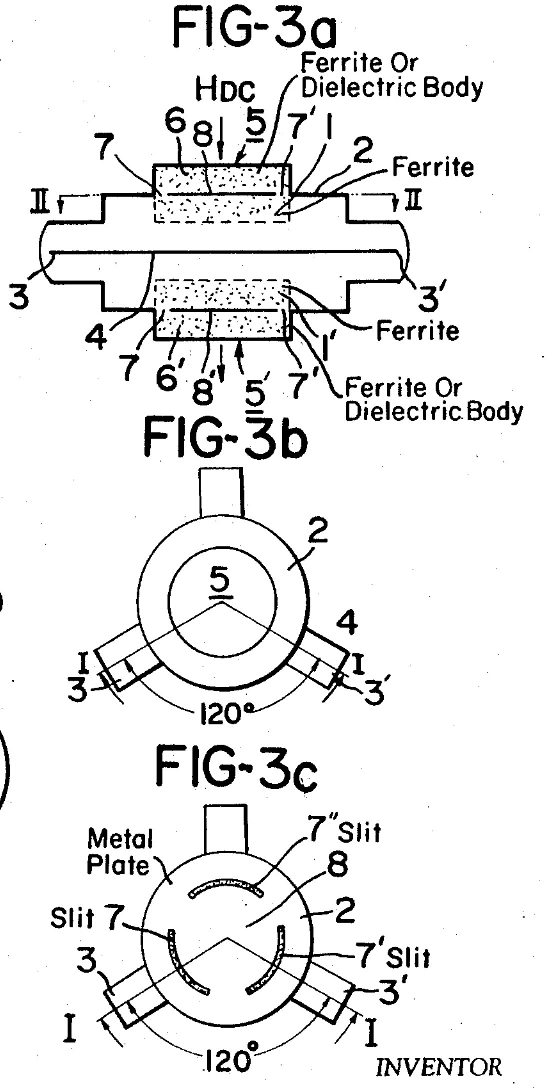
FIG. 3*a* is a cross section taken along line I—I of FIG. 3*b* showing one embodiment of a circulator according to the invention.
FIG. 3*b* is a plan view thereof.
FIG. 3*c* is a horizontal cross section taken along line II—II of FIG. 3*a*, showing a slit portion of the circulator.

FIGS. 3*a*, 3*b* and 3*c* show a practical embodiment of a circulator according to the invention, in which corresponding portions to FIGS. 2*a* and 2*b* are designated by the same reference numerals. In these figures 1 and 1' are the ferrite plates effecting the proper circulator function. This inventive circulator additionally comprises two ferrite plates 6 and 6' having approximately the same diameter with that of the ferrite plates 1 and 1'. These additional ferrite plates or dielectric bodies 6 and 6' are contained at the inside of the outer conductor constituting the circulator structure and arranged at a location adjacent to the ferrite plates 1 and 1' respectively. The ferrite plates 6 and 1 and also 6' and 1' are separated by metal partitions 8 and 8', respectively. The partitions 8 and 8' comprise three slits 7, 7' and 7'' as shown in FIG. 3*c* at the periphery portion thereof. These additional ferrite plates are enclosed at the inside of the outer conductors of the circulator resonators 5 and 5'. An outer magnetic field $H_{DC}$ is applied vertically to the circulator and to the four ferrite plates. The resonator acts as a TM–020 mode resonator, and couples with the central conductor coupling portion through the slits 7, 7' and 7''.

Figure 5A:
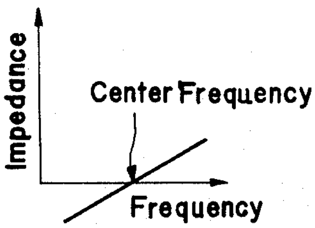
FIG. 5*a* is a diagram showing the relation between excitation frequency and input impedance of a circulator for a same phase excitation.
Figure 4A:
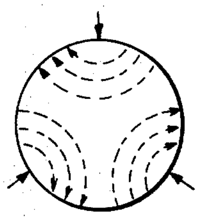
FIG. 4*a* is an illustration of the mode of the magnetic field in a ferrite disk for a same phase excitation.

The operation of the above mentioned inventive circulator will be described hereinafter. When the three terminals of the circulator are excited by same phase excitation energy, the magnetic field distribution of the electromagnetic field inside of the circulator is as shown in FIG. 4*a*. In this condition the impedance of the circulator assumes a value substantially equal to zero. When the excitation frequency is varied, the impedance value makes a slight change accordingly about the zero point as shown in the diagram of FIG. 5*a*. Said variation of the impedance is shown on a Smith chart as in FIG. 6, wherein $A \to A'$ represents said variation.

Figure 4B:
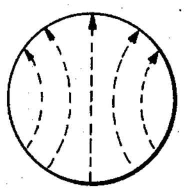
FIG. 4*b* is also an illustration of magnetic field distribution in the case of positive or negative excitation.

Then when we considered the rotating direction of the phase of the field, as the case of positive or negative phase excitation, the distribution of the magnetic field is as shown in FIG. 4*b*. This magnetic field distribution further rotates in a positive (clock-wise) or negative (counter-clockwise) direction.

Figure 5B:
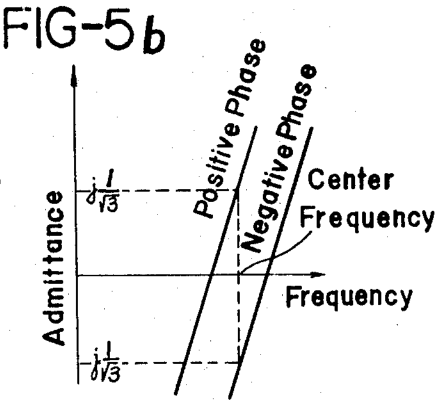
FIG. 5*b* is a diagram showing the relation between the excitation frequency and admittance of a circulator for a positive or negative excitation.

The admittance value of the circulator in the positive and negative excitation is expressed by the following equation:

$$\pm j \frac{1}{\sqrt{3}} Y$$

wherein Y is the characteristic impedance of the transmission line. This admittance value varies greatly according to the variation of excitation frequency and the change is ilustrated in diagram of FIG. 5*b*. This admittance value varies on the Smith chart as indicated by $B \to B'$ and $C \to C'$ as shown in FIG. 6.

Figure 6:
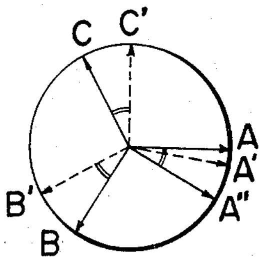
FIG. 6 shows a variation of each eigen value on a Smith Chart.

The impedance variation of $A \to A'$ on the Smith chart as shown in FIG. 6 in the circulator having the conventional construction is a value considerably smaller than the variation of $B \to B'$ or $C \to C'$. Accordingly, in the conventional circulator even the mutual angle relation between A, B and C is kept at 120° to each other at the center frequency of the excitation signal, this symmetrical condition no longer exists for the shifted frequencies as shown as A', B' and C' on the Smith chart. This is the reason the conventional circulator has a certain limitation in the operating frequency band and thus limits the function to work as a wide frequency circulator.

Contrary to the above mentioned conventional circulator, the circulator according to the invention comprises resonators at the top and bottom of the ferrite body which are coupled through the slits, which resonator acts as a TM—020 mode resonator and couples with the same phase excitation mode which has the strongest magnetic field at the feeding point of the circulator. While as the magnetic field represents zero mode in the circumferential direction the resonators do not couple with the negative phase excitation. For the same phase excitation, the slits assume zero impedance value at the center frequency and reactive energy is stored in the resonators. Therefore, the circulator according to the invention functions as an equivalent device having a series resonating circuit at the coupling portion of the inner conductor. The circulator if viewed from each terminal spaced by a distance of $\lambda/4$ from the coupling portion, is deemed to be an equivalent device having a parallel resonating circuit at the coupling portion. Owing to the presence of this series resonating circuit, the impedance variation effective for the same phase excitation component becomes a large value, so that the variation $A \to A'$ on the Smith chart in the conventional circulator now changes to $A \to A''$ in the case of the circulator according to the invention. On the contrary, since for the positive and negative excitation the TM—020 mode of this resonator does not couple entirely, and since the position of the slits coincides with the weakest point of the magnetic field of positive and negative phases, therefore the presence of the resonators substantially does not give any influence to those phases. By this reason the variation $B \to B'$ and $C \to C'$ remains unchanged. Accordingly, if we choose said value of variation $A \to A''$ equal to $B \to B'$ ($\approx C \to C'$) a circulator having a wide frequency band characteristic may thus be obtained.

Figure 7:
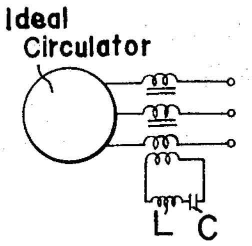
FIG. 7 is an equivalent circuit diagram of a circulator according to the invention.

FIG. 7 shows an equivalent circuit diagram of the circulator according to the invention as explained above. As shown in this diagram a series resonating circuit is included for each of the terminals only in case of the same phase excitation, and in case of positive or negative phase excitation no LC resonating circuit is included. Therefore, the circulator according to the present invention has a remarkable feature to effectively widen the operative frequency band.

The characteristics of the circulator of the invention for temperature variation will be described hereinafter. In the circulator of the invention, the permeability of ferrite bodies may decrease according to the increase of temperature, a smallest amount of variation of the permeability is shown in the case of same phase excitation, variations in the case of negative and positive phases are substantially the same and the amount is larger than that of the case of same phase excitation. The reason for the above may be explained by the following assumption. Namely, the function of the circulator may be understood by considering a circulator, which has an input impedance for the same phase excitation wave consisting of a series resonating circuit, of which the L component includes a magnetic body having effective permeability $$\mu_{eff}=\frac{2\mu_{+}\cdot\mu_{-}}{\mu_{+}+\mu_{-}}$$

and that for the positive and negative phase excitation wave consisting of a parallel resonance circuit, of which the L component includes positive or negative circular polarized permeability $\mu_{+}$ and $\mu_{-}$. In such an equivalent circulator the permeabilities $\mu_{eff}$, $\mu_{+}$ and $\mu_{-}$ are all decreased at nearly the same rate in the range of the effective operating DC magnetic field according to an increase of the temperature. On the other hand, by the fact that the values for same phase excitation do not vary if only the frequency is varied while keeping the temperature constant, it may be concluded that the L component of the series resonating circuit is a very small value. Accordingly, it may be derived that the variation of series impedance owing to the variation of the temperature is also a very small value.

By a principle set forth as above, the circulator according to the invention as shown in FIG. 3 has a remarkable feature for a wide frequency band characteristic, moreover this characteristic is independent from the temperature variation.

Figure 8:
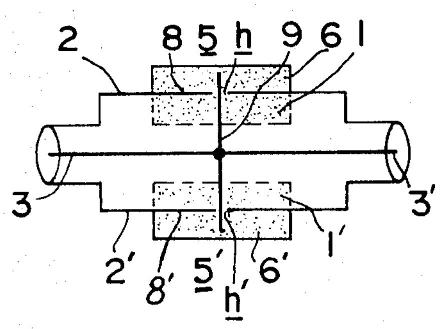
FIG. 8 is a modified embodiment of the circulator according to the invention.

The circulator of the present invention may be realized in various manners. The embodiment explained in FIG. 3 provides slits, through which the same phase energy is introduced into the resonators. FIG. 8 shows another embodiment of the invention, in which corresponding portions to FIG. 3 are indicated by the same reference numerals. In this embodiment, the partitions 8 and 8' are provided with central holes *h* and *h'*, respectively, through which a coupling post 9 is extended to couple the central conductor coupling portion with the two resonators 5 and 5', respectively. In this embodiment, only the same excitation energy couples to the resonators by capacitive coupling since the same phase excitation voltage has a maximum value at the center and on the contrary, the positive or negative excitation components have a value zero at the center so that no capacitive coupling exists.

Figure 9:
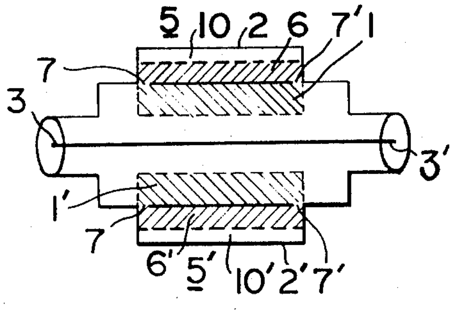
FIG. 9 is another embodiment of the circulator according to the invention.

FIG. 9 shows another embodiment of a circulator according to the invention. In this embodiment, an air layer 10 is provided at the top portion of ferrite or dielectric body 6 in the resonator 5, so that by a suitable setting of the thickness of the air layer 10, the permeability effect of the ferrite is made adjustable so as to adjust the center frequency of the resonator at a desired value. In this figure, 10' shows another air layer in the resonator 5'.

Figure 10:
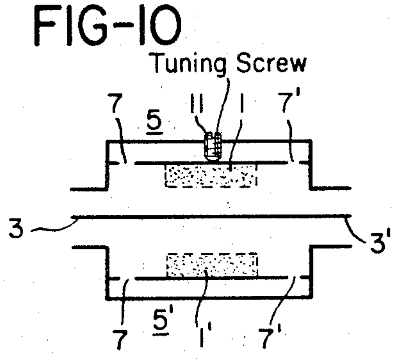
FIG. 10 is still another embodiment of the circulator of the invention.

In case the compensation of the characteristic of the circulator for the temperature variation is not desired, the ferrite bodies 6 and 6' in the resonators 5 and 5' can be dispensed with. FIG. 10 shows an embodiment of the invention for such cases. In FIG. 10, 11 is a metal screw provided at the center portion of the resonator 5. In this embodiment, by adjusting the inside length of the screw 11, the central frequency of the resonator can easily be adjusted.

Figure 11:
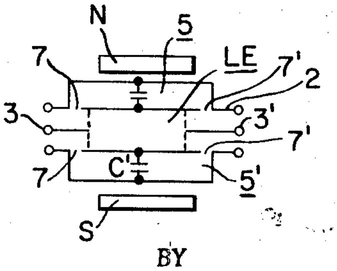
FIG. 11 is a simplified drawing of another embodiment of the circulator of the invention.

FIG. 11 shows other embodiments of the invention, which can be applied for a purpose of improving features of a conventional lumped element type circulator. In this figure LE shows a conventional lumped element Y circulator. The embodiment shown in FIG. 11 comprises condensers *c* and *c'* at the central portion of resonators 5 and 5'. In this embodiment, a resonating element is constructed by an inductance composed by the slit coupling of the outer conductor and a capacitive element consisting of the capacitors *c* and *c'*, which resonating element couples to same phase component only of the exciting energy.

According to the present invention, a material improvement of the circulator for wide frequency operational characteristic may be obtained by the novel principle.

By the salient feature of the invention, a numerous advantages are obtained, which are summarized as follows:

(1) According to the invention, especially utilizing a cavity resonator, not only a small or middle rate circulator may be realized for the wide frequency band purpose, but a large power circulator for the wide frequency purpose may also be realized.

(2) By applying the inventive means for widening the frequency range, another additional feature of constant characteristics over a wide range of temperature variation may be obtained according to the invention.

(3) According to the invention, the conventional means of adding circuit element for wide frequency range purpose for each terminal port is not required, but only the addition of the resonator elements at upper and lower portion of ferrite plates is required.

What is claimed is:

1. A wide frequency band circulator comprising a plurality of terminal ports for coaxial feeding lines and at least one loading ferrite body which is supplied with a controlling DC magnetic field and is placed at a central coupling portion of inner conductors extended from each of the terminal ports, wherein at least one cavity resonator, which couples only to same phase mode excitation energy and is coupled to the central coupling portion of the inner conductors through a slit provided in a partition separating the cavity of the cavity resonator and the coupling portion of the inner conductors of the circulator, is provided inside the circulator.

2. A wide frequency band circulator as claimed in claim 1, wherein the circulator is a lumped element type and a lumped element type capacitor is provided in the cavity resonator so as to form the resonating element together with an inductance composed by the slit.

3. A wide frequency band circulator as claimed in claim 1, wherein a post is extended through the slit in the partition from central coupling portion of inner conductors to the cavity resonator while leaving a clearance between the slit and the post so that the cavity resonator is capacitively coupled with an energy corresponding to the same phase excitation.

4. A wide frequency band circulator as claimed in claim 1, wherein a layer of dielectric substance is inserted at the inside of the cavity resonator so as to effect minaturization of the resonator and to compensate a variation of the center frequency in operation of the circulator owing to a temperature variation.

5. A wide frequency band circulator as claimed in claim 1, wherein a ferrite layer is inserted at the inside of the cavity resonator so as to effect miniaturization of the resonator and to compensate a variation of the center frequency in operation of the circulator owing to a temperature variation.

6. A wide frequency band circulator as claimed in claim 5, wherein the layer in the cavity resonator consisting of ferrite is closely arranged with the ferrite layer loaded at the central coupling portion of the circulator through a partition of the resonator to effect a good heat conduction through each other.

7. A wide frequency band circulator as claimed in claim 5, wherein the layer in the cavity resonator consisting of a dielectric substance is closely arranged with the ferrite layer loaded at the central coupling portion of the circulator through a partition of the resonator to effect a good heat conductor through each other.

References Cited

UNITED STATES PATENTS

| | | | |
|---|---|---|---|
| 3,085,212 | 4/1963 | Clark et al. | 333—1.1 |
| 3,174,116 | 3/1965 | Sur | 333—1.1 |
| 3,286,201 | 11/1966 | Roberts | 333—1.1 |

PAUL L. GENSLER, Primary Examiner

U.S. Cl. X.R.

333—83